United States Patent
Michel (10) Patent No.: US 6,945,021 B2
(45) Date of Patent: Sep. 20, 2005

(54) CHASSIS FOR GRASS TREATMENT MACHINE

(76) Inventor: David Michel, Greentek, Manor Farm, Otley Rd, Adel, Leeds (GB), LS16 7AL ( * ) Notice: Subject to any disclaimer, the term of this patent is extended or adjusted under 35 U.S.C. 154(b) by 0 days.

(21) Appl. No.: 10/471,379
(22) PCT Filed: Mar. 22, 2002
(86) PCT No.: PCT/GB02/01144
§ 371 (c)(1), (2), (4) Date: Sep. 9, 2003
(87) PCT Pub. No.: WO02/076180
PCT Pub. Date: Oct. 3, 2002

(65) Prior Publication Data
US 2004/0118096 A1 Jun. 24, 2004

(30) Foreign Application Priority Data
Mar. 22, 2001 (GB) .............................. 0107175

(51) Int. Cl.⁷ .............................................. A01D 34/62
(52) U.S. Cl. ....................................................... 56/249
(58) Field of Search ................................ 56/11.6, 12.8, 56/12.9, 251, 252, DIG. 8, DIG. 20, 1, 2, 6, 7, 249, 249.5, 294; 474/8, 17, 46, 144–146, 148–150; 172/13–22

(56) References Cited

U.S. PATENT DOCUMENTS

| | | | |
|---|---|---|---|
| 2,283,161 A | 5/1942 | Booton | |
| 3,527,233 A | * 9/1970 | Mathews | ...................... 460/75 |
| 3,783,592 A | 1/1974 | Schraut | |
| 4,064,679 A | 12/1977 | Spinner | |
| 4,601,163 A | 7/1986 | Trelford | |
| 4,637,625 A | * 1/1987 | Blackwell | ................ 280/411.1 |
| 5,261,213 A | 11/1993 | Humphrey | |
| 5,822,965 A | 10/1998 | Chesack et al. | |

FOREIGN PATENT DOCUMENTS

| | | |
|---|---|---|
| DE | 2017981 | 10/1971 |
| GB | 433255 | 8/1935 |
| GB | 1557681 | 12/1979 |
| GB | 2170390 | 8/1986 |
| WO | WO 01/50837 | 7/2001 |

* cited by examiner

Primary Examiner—Robert E. Pezzuto
(74) Attorney, Agent, or Firm—Madson & Metcalf (57) ABSTRACT

A chassis for a grass treatment machine on which an elongate grass treatment module having opposed outer ends may be mounted, and in which the chassis is intended to be mounted in, or form part of, the frame of a grass treatment machine. The chassis has two module mountings which are laterally spaced form each other with respect to the direction of travel of the machine, and each mounting being adapted to receive a respective outer end of the module. The chassis has two chassis portions which can be assembled in order to hold the outer ends of the module in the module mountings in order to mount the module on the chassis, and which can be relatively separated in order to provide access to the module mountings for the purposes of mounting or demounting the ends of the module relative to the chassis.

16 Claims, 7 Drawing Sheets

CHASSIS FOR GRASS TREATMENT MACHINE

This invention relates to a multi-head grass treatment machine having a frame, and a number of grass treatment heads (units) mounted on the frame and each mounting a respective elongate grass treatment module. The invention also relates to a chassis for a grass treatment unit and which is adapted to mount thereon an interchangeable elongate grass treatment module having opposed outer ends by which it is mounted on the chassis.

In this specification, the term "a multi-head (unit) grass treatment machine" is intended to include a so-called golf "greens" mower having a main frame and a number of separate grass treatment heads or units mounted on the main frame, and each comprising a chassis having an elongate grass and/or ground treatment device mounted therein. Examples of treatment device include cylindrical mowers, spikers etc., and which therefore constitute the actual operating mechanism built into the chassis of each unit and which actually treats the grass and/or ground.

The term "grass treatment unit" therefore refers to a complete unit which can be fitted to the frame of a ride-on multi-head grass treatment machine.

The term "chassis" refers to the housing or frame of a grass treatment unit in which the elongate grass and/or ground treatment device is mounted.

The term "grass treatment module", referred to below, includes a grass/ground treatment device which is designed to be quickly and easily removable, replaceable and interchangeable with different modules; within the chassis of each unit.

The invention is particularly (though not exclusively) applied to grass treatment machines of the type which have a ride-on prime mover to which are attached a number of individual grass treatment units. In the case of a mower e.g. a golf "greens" mower, the grass treatment module will be a cylindrical mower unit having spiral cutting blades extending around a central shaft, such blades defining a cylindrical cutting surface spaced radially outwardly of the central shaft. However, the invention is applicable to grass treatment machines utilising other types of grass treatment devices or modules, such as a scarifier, so-called "verticut" device, spiker, rotary brush, top dressing brush, sarel roller, and slitter.

In the past, manufacturers supplied a specific unit for each task i.e. a mower, scarifier or spiker, and having a chassis, a prime mover to drive the chassis over the ground, and operate the treatment device concerned. The other alternative offered by manufacturers in a limited number of instances has been to supply an alternative grass treatment device, such as a rotary brush or scarifier, which may be built into the chassis of the unit, after having first removed the cylindrical mower mechanism. However, in designs available to date, the mounting and de-mounting of each device in the chassis of the unit is a time-consuming and awkward task necessitating a skilled mechanic, and usually requiring bolts or other fasteners to be tightened and loosened, and bearings to be removed, replaced and/or adjusted. Bearing in mind that such multi-unit ride-on grass treatment machines usually have 3, 5 or 7 units, the time involved has dictated that exchanging such grass treatment device has only been done on a most infrequent basis.

However, the current need for increased worker efficiency coupled with an increasing demand for additional treatments to be regularly carried out on sports turf to improve its condition and playing characteristics, has meant that there is a real need for a way to be found of quickly and easily interchanging a wide range of grass treatment devices within the chassis of such grass treatment units, rather than purchasing may separate sets of specific grass treatment units. The present invention has been developed with a view to providing a chassis for a grass treatment unit having improved means to facilitate mounting and de-mounting of elongate grass/ground treatment modules (e.g. cylindrical or generally cylindrical devices), so that even an unskilled person, such as the mower operator, can quickly and easily interchange a range of grass treatment modules within such chassis.

According to one aspect of the invention there is provided a chassis for a grass treatment unit and which is adapted to mount thereon an elongate grass treatment module having opposed outer ends by which it is mounted on the chassis, and in which:

the chassis is intended to be mounted on the frame of a grass treatment machine; and the chassis has at least one module mounting which is adapted to facilitate easy attachment and removal of a respective grass treatment module.

This could be implemented in a variety of different ways, such as one or more slots formed in side plates of the chassis, into which the module mountings can be slidably mounted. Alternatively, flanges on the chassis may have module mountings onto which the modules can be replaceably mounted, and preferably without need for fastener bolts or the like to complete the assembly. Regardless of the means adopted, the objective is to enable the interchanging of modules to be carried out as quickly and simply as possible.

Preferably, the chassis has two module mountings which are laterally spaced from each other, with respect to the direction of travel of the machine, and each mounting being adapted to receive a respective outer end of the module.

The chassis may comprise two chassis portions which can be assembled in order to hold the outer ends of the module in the module mountings in order to mount the module on the chassis, and which can be relatively separated in order to provide access to the module mountings for the purposes of mounting or de-mounting the ends of the module relative to the chassis.

Therefore, a preferred aspect of the invention provides, by a very quickly operated and simple means, a capability of mounting and de-mounting a grass treatment module in that (a) access can be had readily to the mountings when required by relative separation of the chassis portions and (b) when the chassis portions are assembled, the ends of the module are securely mounted on the chassis so that the module can carry out an appropriate grass treatment operation.

Preferably, the two chassis portions are interengageable when assembled, and one of the chassis portions is removable from engagement with the other chassis portion to provide access to the module mountings.

The two chassis portions are therefore preferably connected together for relative movement between an assembled condition and a separated condition.

One of the chassis portions may be pivotally connected to the other chassis portion for movement between an engaged position in which the ends of the module are held in the module mountings, and a release position in which the ends of the module can be removed from the mountings.

The chassis portions may therefore define socket mountings which surround the ends of the module, when the portions are in the engaged position, and in which parts of the sockets move away when the chassis portions are in the release position.

In a preferred arrangement, a first chassis portion defines a major part of each mounting socket, and a second chassis portion defines a minor portion of each mounting socket, whereby the major part of each socket mounting receives the respective module end when the chassis portions are in the release position, prior to movement of the second chassis portion to the engaged position.

The chassis preferably comprises two sides which are spaced apart transversely with respect to the direction of travel, and the two mountings may comprise square or other cross section sockets to receive the ends of the module. The chassis portions therefore are provided with, or define the sockets, and when the chassis portions are separated, part of the periphery of each socket opens outwardly to permit access to the mountings for the ends of the module. In the case of a square cross section socket, one of the chassis portions may define three sides of the socket, and the other chassis portion may define the fourth (openable) side. Alternatively, each chassis portion may define two sides of the square socket.

The two chassis portions may be pivotally connected together, to form a forward portion and a rearward portion, and in which the forward portion is pivotable forwardly and downwardly of the rearward portion in order to take-up an open (separated) position, and which makes it particularly easy to mount and de-mount the ends of the module with respect to the sockets.

The forward portion of the chassis may carry a usual front roller, preferably vertically adjustable to alter the height of the module above the grass surface. The rearward portion may be supported by a rear roller.

The grass treatment module may comprise a cylindrical mower unit, a scarifier device, a verticut device, a spiker or a brush etc.

In a particularly preferred arrangement, a multi-unit grass treatment machine is provided having a frame, and a number of grass treatment units mounted on the frame and each mounting a respective elongate grass treatment module, in which each treatment unit is formed by a chassis according to said one aspect of the invention, and optionally having one or more of the preferred features referred to above.

According to a further aspect of the invention there is provided a multi-unit grass treatment machine having a frame, and a number of grass treatment units mounted on the frame and each mounting a respective elongate grass treatment module, in which each unit has a pair of module mountings which are laterally spaced from each other with respect to the direction of travel of the machine and in which the respective grass treatment module is removably mounted.

Preferred embodiments of chassis according to the invention, for mounting in a grass treatment machine will now be described in detail, by way of example only, with reference to the accompanying drawings, in which.

Figure 1:
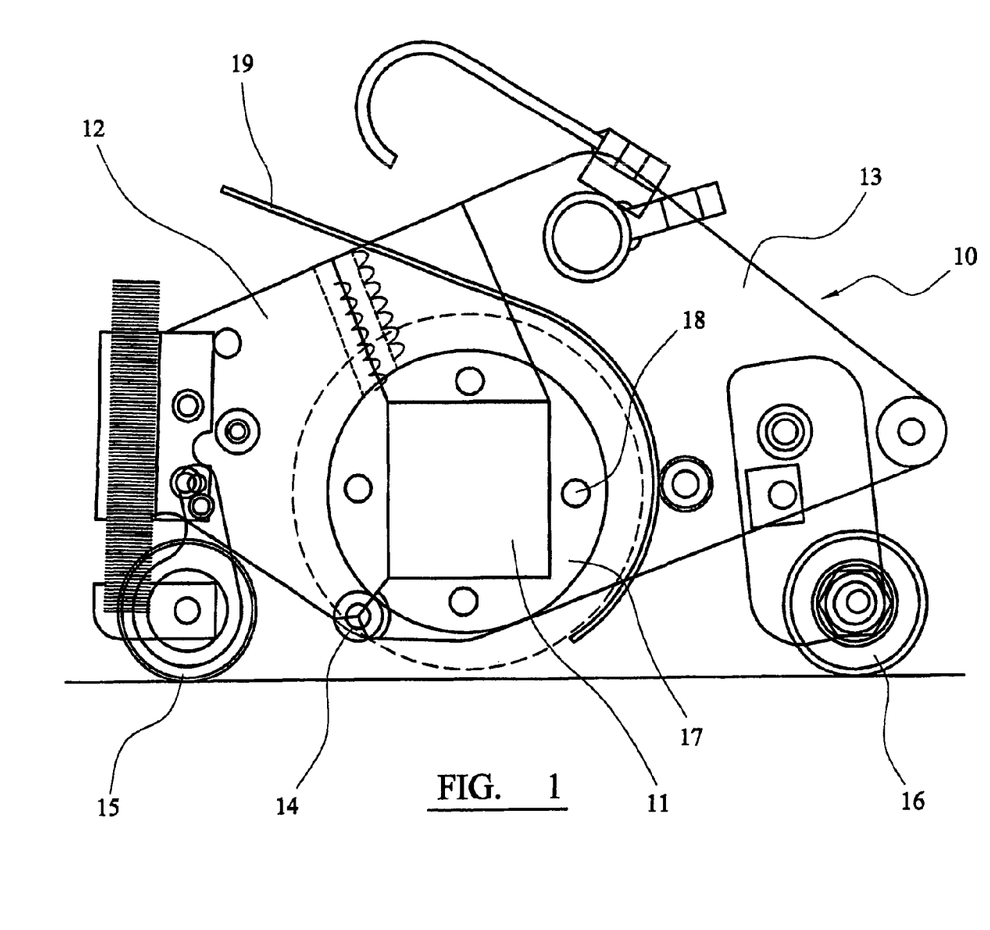
FIG. 1 is a side view of a first embodiment of the chassis, showing two chassis portions assembled to a closed position in which a generally horizontally extending grass treatment module can be mounted in the chassis ready to carry out a grass treatment.
Figure 2:
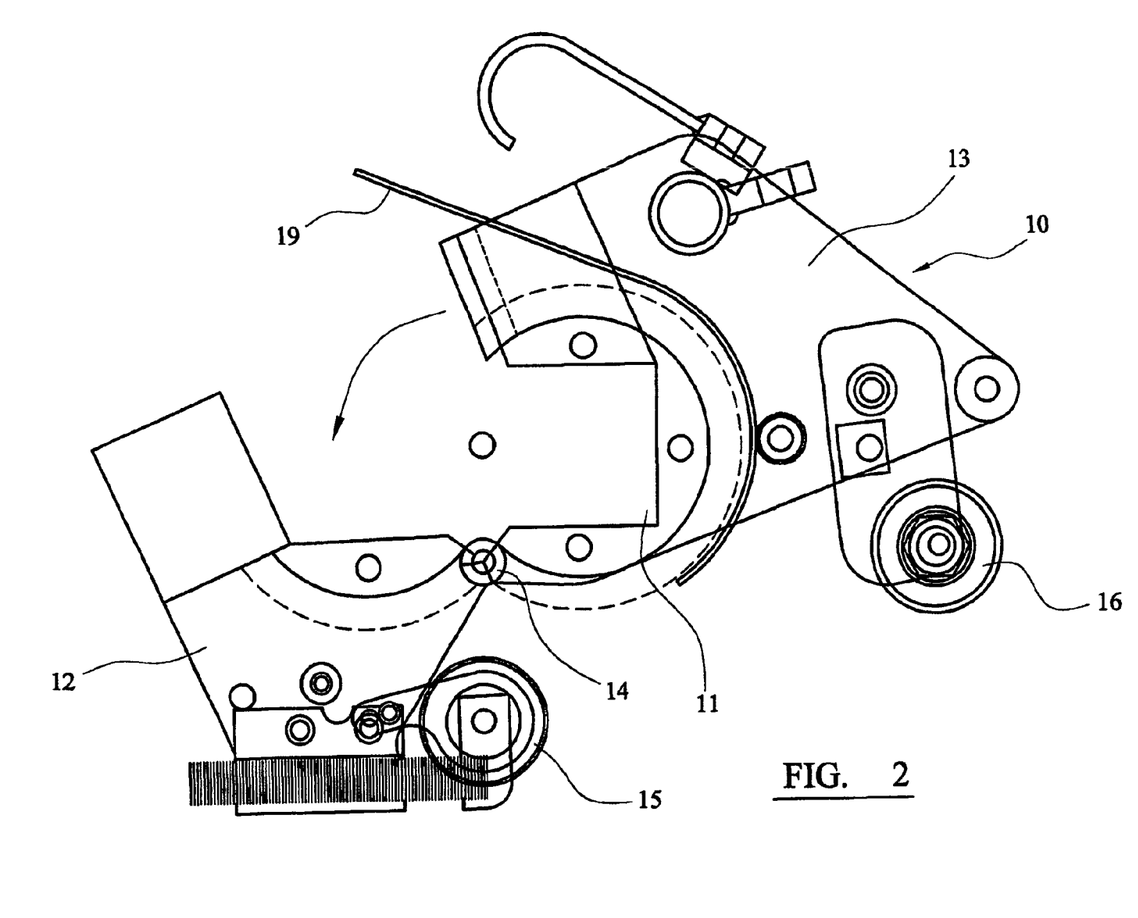
FIG. 2 is a side view, but showing the two chassis portions dis-assembled to an open, separated position, permitting access to socket mountings for the ends of the module, to allow easy mounting and de-mounting of the module.
Figure 3:
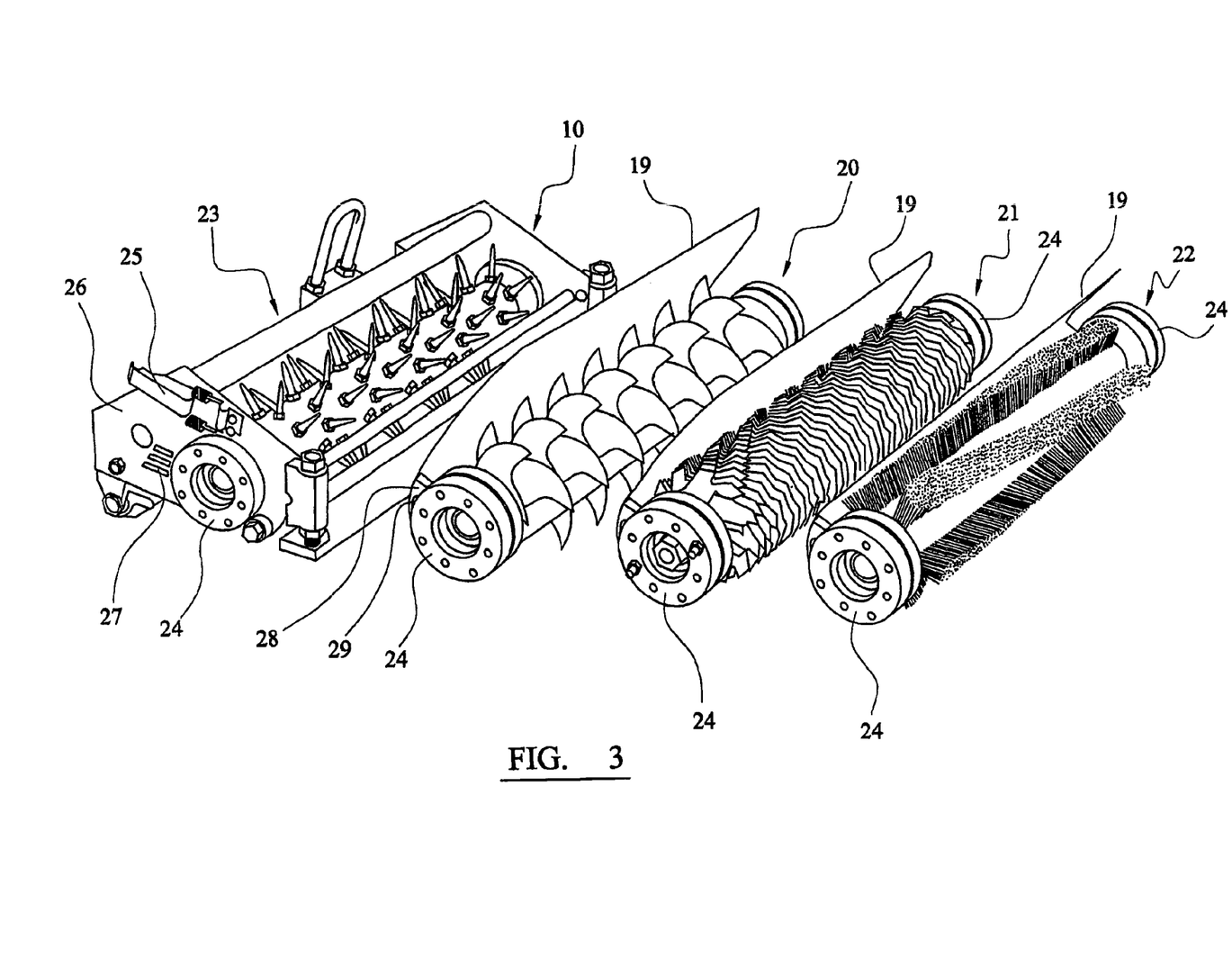
FIG. 3 is a perspective illustration of a number of different grass treatment modules which can be readily replaceably mounted in the chassis of FIGS. 1 and 2.

Referring now to FIGS. 1 to 3 of the drawings, a chassis according to the invention is designated generally by reference 10, and which is intended to be mounted in, or on the frame of a multi-head grass treatment machine. Each treatment head (unit) therefore is formed by the chassis 10 and has socket mountings 11 which are spaced apart perpendicularly of the direction of travel of the machine and which serve to mount rotatably the outer ends of the grass treatment module, (which may comprise a cylindrical mower unit, a scarifier unit, a verticut device, a spiker or a brush etc).

The chassis 10 therefore defines two opposed sides which are spaced apart perpendicularly of the direction of travel, and with each side having a respective socket mounting 11 provided therein.

The chassis 10 comprises a forward portion 12 and a rearward portion 13, and which are connected together for movement between an open, separated position shown in FIG. 2, and a closed or assembled position shown in FIG. 1. In the open position shown in FIG. 2, access is permitted to the mounting sockets 11 for the purposes of mounting or de-mounting the ends of the grass treatment module. In the closed position shown in FIG. 1, the grass treatment module can be mounted in the chassis ready to carry out an appropriate grass treatment operation.

In the illustrated embodiment, the socket mountings 11 comprise square cross section sockets, and part of the periphery of each socket is defined by one of the portions (three sides of the socket in the case of the rearward portion 13 in the illustrated embodiment), and the remaining part of the circumference (the outwardly opening side defined by the forward portion 12 in the illustrated embodiment) is defined by the other portion.

The two chassis portions 12 and 13 are pivotally connected together via horizontally extending pivot 14, and evidently, from FIG. 2, the forward portion 12 is pivotable forwardly and downwardly of the rearward portion 13 in order to take-up the open position, and this makes it particularly quick and easy to mount and de-mount the ends of the module with respect to the socket mountings 11.

The forward portion 12 of the chassis 10 carries a usual front roller 15, and which is vertically adjustable to alter the height of the module above the grass surface. The rearward portion 13 is supported by a rear roller 16.

Although not shown in FIG. 1 or 2, when the chassis portions 12 and 13 are moved relatively to the closed or assembled position shown in FIG. 1, there will usually be provided simple quick release fasteners, to hold the abutting faces of the chassis portions 12 and 13 in engagement with each other.

The illustrated embodiment therefore provides a simple "break-open" chassis, allowing easy access to the socket mountings so that the outer ends of the module concerned can be easily mounted and de-mounted. The location of the abutting faces of the chassis portions, in the closed position, is not critical, provided that when in the closed position the socket mountings are closed and hold the module ends securely. Also, the two chassis portions should be able to "break-open" to a sufficient extent to allow the mounting and de-mounting of the module concerned.

The modules provided for use with the chassis 10 of the invention may comprise different types of treatment modules (20, 21, 22, 23), as shown in FIG. 3. Each side of the chassis may have a mounting flange 17 with two or more different mounting holes 18 to allow different types of drive mechanism e.g. hydraulic motor, to be connected to the mounting flange. FIG. 3 shows opposed outer ends 24 of the modules which can be angularly adjusted through 90° increments relative to the mounting sockets 11.

The illustrated embodiment of FIGS. 1 and 2 also provides a cover plate 19 extending forwardly and upwardly from the chassis portion 13, and the purpose of this is to guide the forward movement of material produced during the grass treatment operation. As an alternative, a guard or cover plate 19 may be formed as a component part of the module which is to be mounted in and de-mounted from the chassis (see FIG. 3). Also, as shown in FIG. 3, the two portions of the chassis 10 are releasably held together by spring-loaded releasable fastener latches 25.

The illustrated embodiment of chassis according to the invention has an assembled condition, as shown in FIG. 1, in which the outer ends of the module can be held in the module mountings, in order to mount the module on the chassis. The embodiment also permits the two chassis portions to be relatively separated in order to provide access to the module mountings, for the purposes of mounting or de-mounting the ends of the module relative to the chassis.

In the illustrated embodiment, movement between the assembled condition shown in FIG. 1, and the (separated) open, disassembled condition shown in FIG. 2 is achieved simply by pivotally connecting the chassis portions 12 and 13 together via horizontally extending pivot 14. However, it should be understood that the invention contemplates alternative modes of converting the chassis between an assembled condition and a separated condition. By way of example only, although not shown, one main portion of the chassis may form the major part of the socket mounting for the ends of the module, and a further portion of the chassis may be removably connectable thereto, so that such portion can be easily assembled, to complete the formation of the socket mountings and the mounting in position of the module. However, the further portion can be easily removed entirely, to leave the socket mountings open so that a module can be mounted or de-mounted easily. Preferably, a simple slidable inter-engagement may be provided between the main portion of the chassis and the removable chassis portion, together with provision of simple snap-acting or other easily operated fasteners.

FIG. 3 shows a spiked treatment module 23 mounted in chassis 10, and with module end plate 24 projecting outwardly of the chassis side and a suitable mounting part (not shown) of the module received by the socket mounting (11). The opposed sides 26 of the chassis 10 (see FIG. 3) define the socket mountings, and also have air vents 27 formed in the sides which admit air to the module chamber via hole 29 in an arcuate distance piece 28 which mounts the plate 19 on the cartridge (20, 21, 22).

It should be understood that the provision of two chassis portions (12, 13) is one preferred embodiment of the invention (having an assembled condition and a dis-assembled or separated (release) condition), and that the invention contemplates a chassis which may have an assembly of more than two chassis portions, at least one of which may be separated from the assembly for mounting and de-mounting of the module.

Furthermore, the invention also includes the provision of a single portion chassis having one or more module mountings which facilitate easy attachment and removal of a respective grass treatment module. This may be implemented in a number of different ways, some of which are described below, by way of example only.

One or more slots may be formed in the side plates of the chassis into which the modules may be slidably mounted. Alternatively, flanges on the chassis may have module mountings onto which the modules can be replaceably mounted, and preferably without need for fastener bolts to complete the assembly.

The primary objective will be to enable the interchanging of modules to be carried out as quickly and simply as possible.

Figure 4:
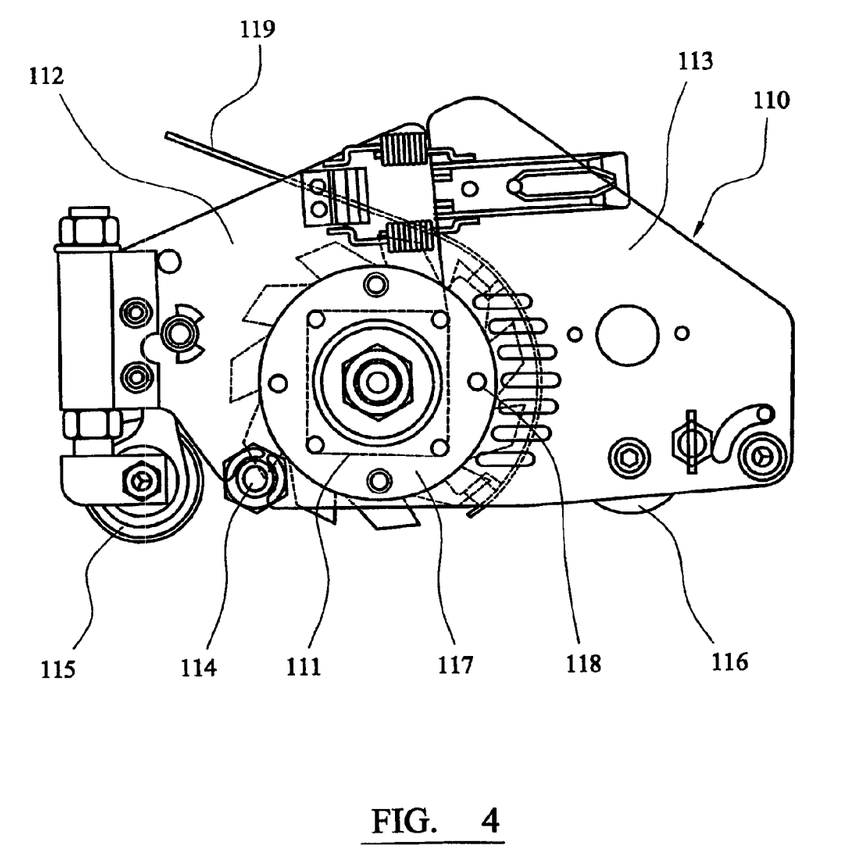
FIGS. 4 and 5 are side views of a second embodiment of chassis, in an assembled condition and separated conditions respectively.
Figure 5:
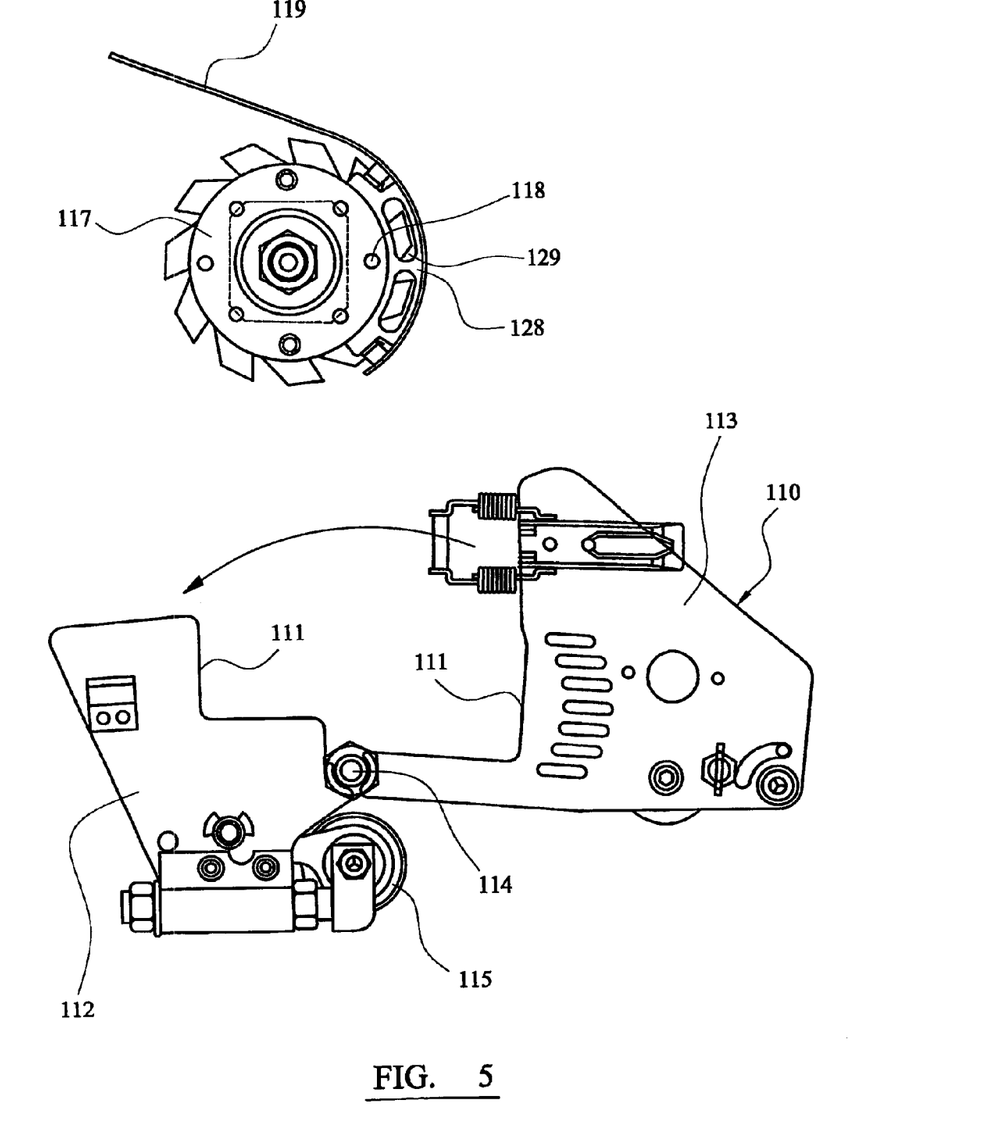
Figure 6:
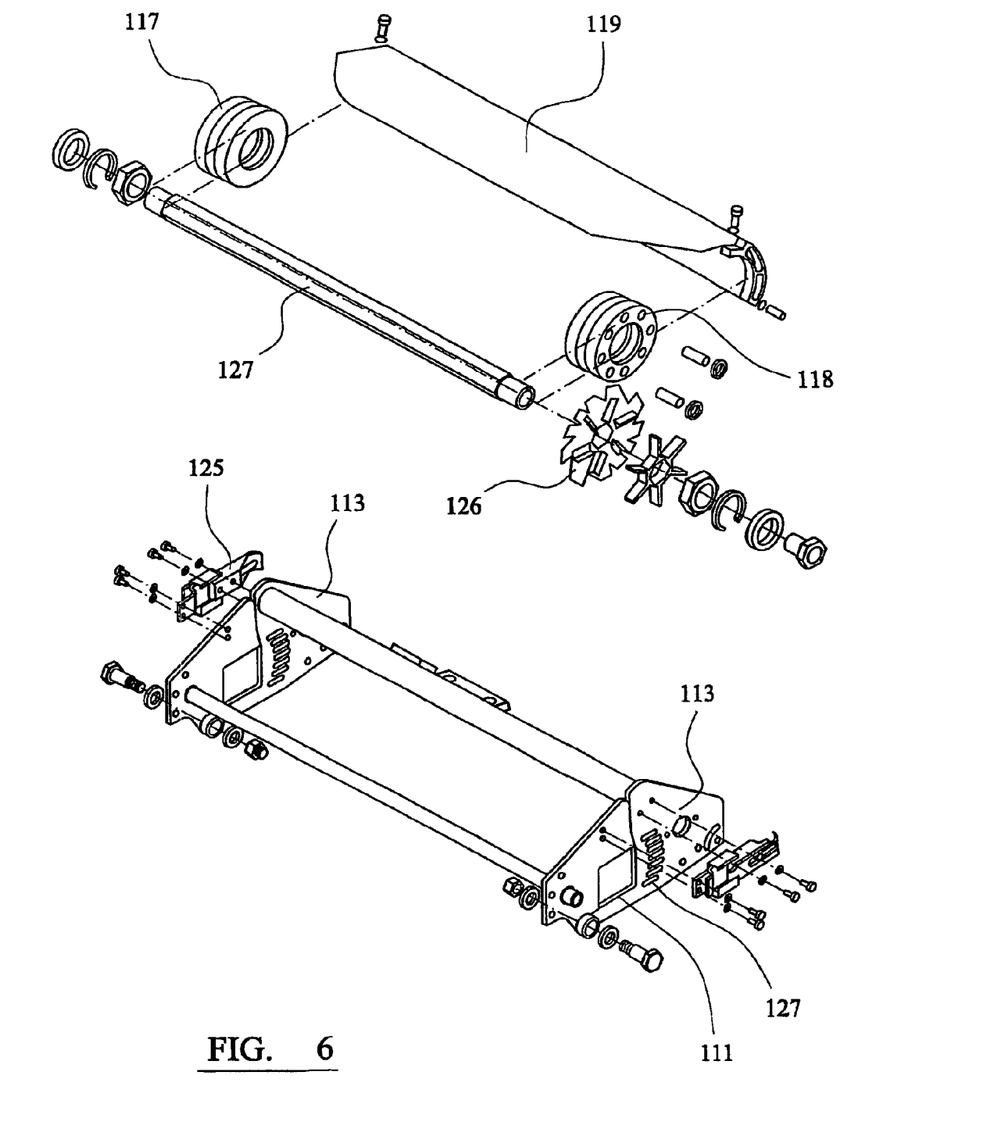
FIG. 6 is an exploded view of the components of the second embodiment of chassis.
Figure 7A:
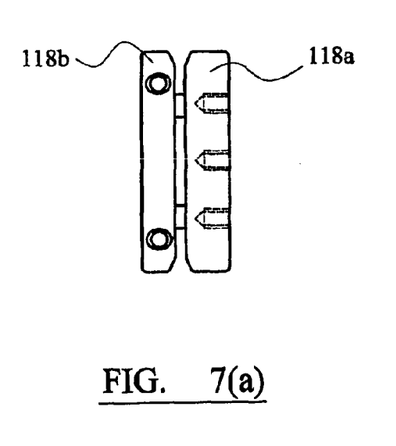
FIGS. 7a to 7e are side, end and sectional views showing in more detail the construction of the end mountings of each treatment module.
Figure 7B:
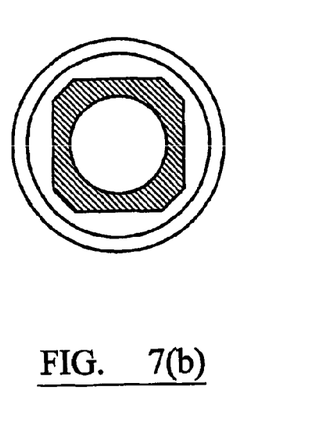
Figure 7C:
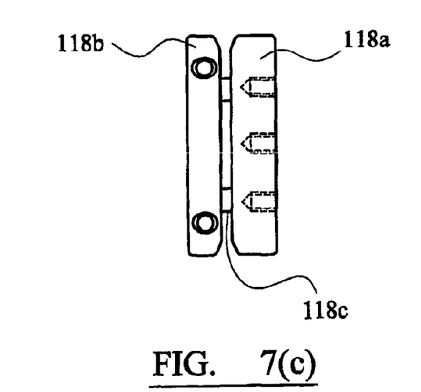
Figure 7D:
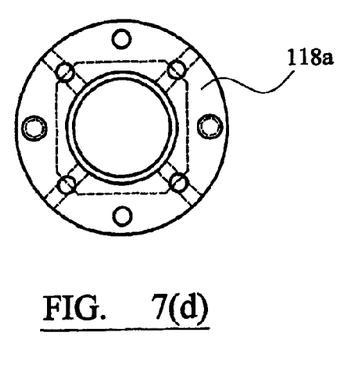
Figure 7E:
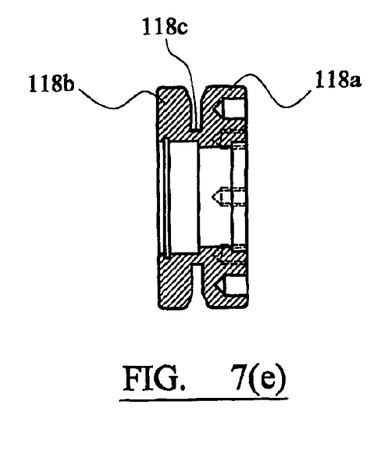

Referring to FIGS. 4 to 6, there is shown a second embodiment of chassis according to the invention, and in which parts corresponding with those already described are given the same reference numerals, but with the addition of 100.

The main difference in the second embodiment is the way in which the mounting socket 111 is formed by the two chassis portions 112 and 113. As can be seen particularly in FIG. 5, each chassis portion defines two sides only of the square-shaped mounting socket (when assembled).

FIG. 6 shows an exploded view of the component parts of the chassis, and also of an interchangeable "cartridge" or grass treatment module, provided with a number of "verticut" toothed plates 126, spaced apart along the length of drive shaft 127. This also shows the end plates 124 by which the cartridge or module is removably mounted in socket mountings 111, and a suitable square mounting part is provided between the inner and outer of each pair of mounting plates forming the outer ends of the module.

The square mounting part is defined between inner and outer end plates 118a and 118b, shown in FIGS. 7a to 7e, and is formed by a square cross-section part 118c which slidably fits onto socket mounting 111, with outer end plate 118a located on the outside face of the chassis side, and the inner end plate 118b on the inside face of the chassis side. If required, an adjustment facility (not shown) may be provided between the mounting part 118c and socket mounting 111, to allow height adjustment of the module.

What is claimed is:

1. A chassis for a grass treatment unit and which is adapted to mount thereon an elongate grass treatment module, and in which:

the chassis is sized and configured to be mounted on the frame of a grass treatment machine;

the chassis has two module mountings which are adapted to facilitate easy attachment and removal of a respective grass treatment module, and the module mountings are laterally spaced from each other with respect to the direction of travel of the machine, and each mounting being adapted to receive a respective outer end of the module; and the chassis comprising two chassis portions which can be assembled in order to hold the outer ends of the module in the module mountings in order to mount the module on the chassis, and which can be relatively separated in order to provide access to the module mountings for the purposes of mounting or de-mounting the ends of the module relative to the chassis.

2. A chassis according to claim 1, in which the two chassis portions are interengageable when assembled, and in which one of the chassis portions is removable from engagement with the other chassis portion to provide access to the module mountings.

3. A chassis according to claim 2, in which the two chassis portions are movably connected together for relative movement between an assembled condition and a separated condition.

4. A chassis according to claim 1, in which one chassis portion is pivotally connected to the other chassis portion for movement between an engaged position in which the ends of the module are held in the module mountings, and a release position in which the ends of the module can be removed from the mountings.

5. A chassis according to claim 4, in which the chassis portions together define socket mountings surrounding mounting parts of the module, when the portions are in the engaged position, and in which parts of the sockets are moveable away when the chassis portions are in the release position.

6. A chassis according to claim 5, in which a first chassis portion defines a major part of each socket mounting whereby to receive the respective mounting part of the module when in the release position, and a second chassis portion defines a minor part of each socket mounting which completes the formation of the socket mounting when the first and second chassis portions are relatively movable to the assembled condition.

7. A chassis according to claim 6, in which each socket mounting is four sided, and the first chassis portion defines two or three sides of the socket mounting, and the second chassis portion defines the two or one side of the socket mounting.

8. A chassis according to claim 7, in which each socket mounting is square, and the respective treatment module is adjustable through 90° increments to provide required mounting of the module in the socket mounting.

9. A chassis according to claim 1, having a pair of opposed sides each defining a respective one of a pair of module mountings.

10. A chassis according to claim 9, in which each side has one or more vents formed therein, to admit air to the module chamber and promote discharge of debris.

11. A chassis according to claim 1, in which the treatment module is adjustably mountable in the module mountings to permit height adjustment of the module.

12. A grass treatment machine incorporating a chassis for a grass treatment unit and which is adapted to mount thereon an elongate grass treatment module, and in which:

the chassis is sized and configured to be mounted on the frame of a grass treatment machine;

the chassis has two module mountings which are adapted to facilitate easy attachment and removal of a respective grass treatment module, and the module mountings are laterally spaced from each other with respect to the direction of travel of the machine, and each mounting being adapted to receive a respective outer end of the module; and the chassis comprising two chassis portions which can be assembled in order to hold the outer ends of the module in the module mountings in order to mount the module on the chassis, and which can be relatively separated in order to provide access to the module mountings for the purposes of mounting or de-mounting the ends of the module relative to the chassis.

13. A multi-unit grass treatment machine comprising:

a frame, and a number of grass treatment units mounted on the frame and each mounting a respective elongate grass treatment module, in which each grass treatment unit has at least one module mounting by which the respective grass treatment module is removably mounted in the unit, in which each grass treatment unit has a chassis which is mounted on the frame of the machine, and which is provided with a pair of module mountings which each receive a respective end of the respective treatment module, in which each chassis comprises two chassis portions which are interengageable when assembled, and in which one of the chassis portions is removable from engagement with the other chassis portion to provide access to the module mountings.

14. A machine according to claim 13, in which the two chassis portions are movably connected together for relative movement between and assembled condition and a separated condition.

15. A machine according claim 13, in which one chassis portion is pivotally connected to the other chassis portion for movement between an engaged position in which the ends of the module are held in the module mountings, and a release position in which the ends of the module can be removed from the mountings.

16. A machine according to claim 15, in which the chassis portions together define socket mountings surrounding mounting parts of the module, when the portions are in the engaged position, and in which parts of the sockets are movable away when the chassis portions are in the release position.

* * * * *